Dec. 16, 1952  J. G. ELSE  2,621,876
ENGINE MOUNTING
Filed Oct. 28, 1948
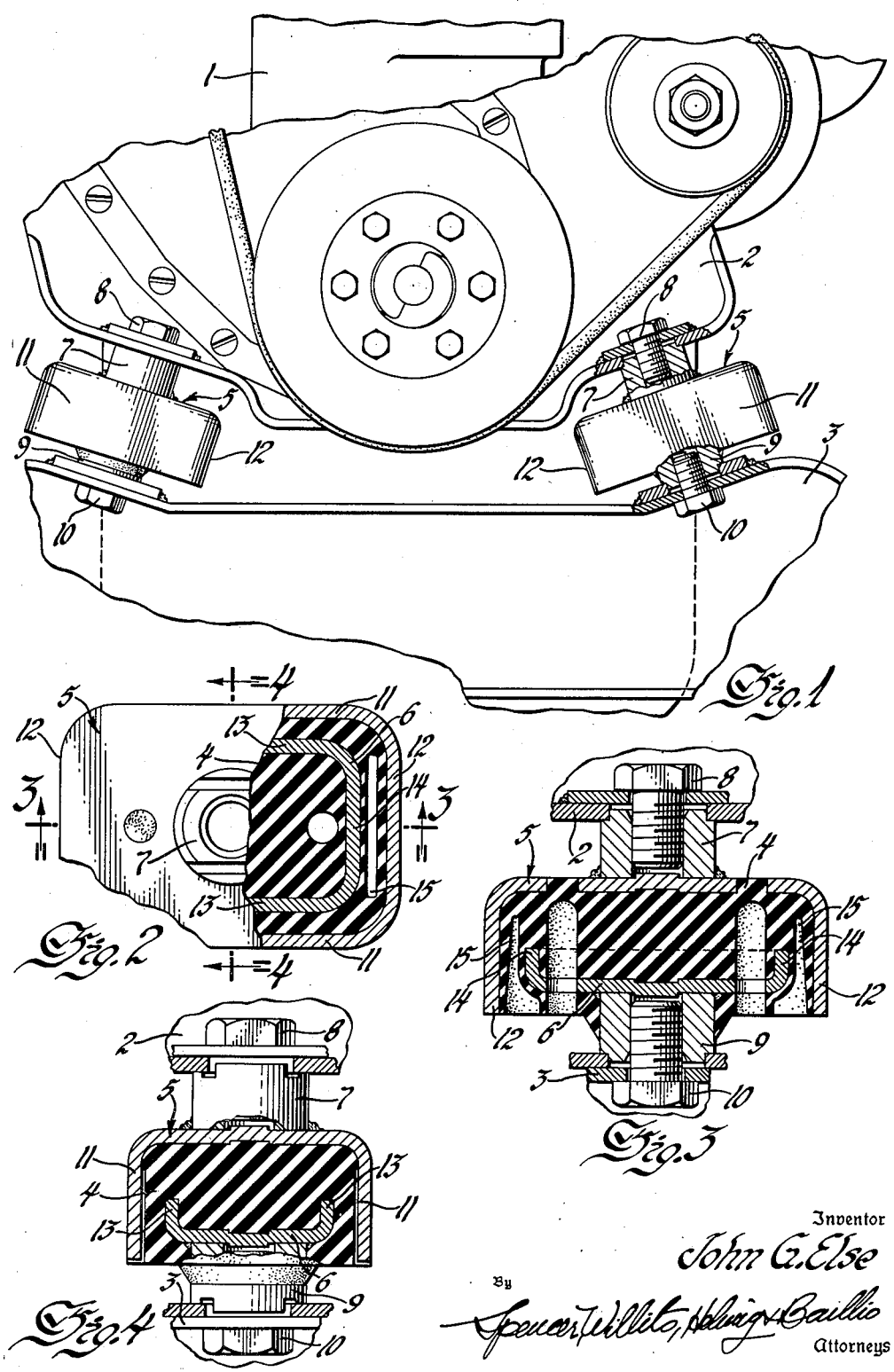
Inventor
John G. Else
By
Spencer Willits, Helwig & Caillio
Attorneys Patented Dec. 16, 1952

2,621,876

UNITED STATES PATENT OFFICE 2,621,876

ENGINE MOUNTING

John G. Else, Detroit, Mich., assignor to General Motors Corporation, Detroit, Mich., a corporation of Delaware Application October 28, 1948, Serial No. 57,064

4 Claims. (Cl. 248—7)

In the attachment of an internal combustion engine in an automobile it has been the practice to employ soft rubber insulating cushions which readily yield with elastic resistance to relative movement between the engine and its supporting structure and thus reduce transmission of vibratory forces and minimize disturbance to comfort. While a large freedom of movement with elastic restraint is effective the practical considerations call for restraint to the range of relative movement in different directions. The forces are most pronounced in a direction transverse to the engine crankshaft at the front than in vertical and longitudinal directions and the range of free movement should be greatest in the transverse direction.

For the past several years the front of the engine in the Chevrolet automobile has been supported by a pair of spaced connections each including a rubber pad sandwiched between a pair of attachment plates having angular flanges along their front and rear edges with the rubber pad projected between the flanges for resiliently confining fore and aft movement. No similar limit stops were provided for restricting side movement and except for the elastic resistance of the rubber which has been vulcanized or surface bonded with the metal attachment plates no restraint was placed on lateral movement. While this mounting has been eminently satisfactory there have been a few installations which failed to meet full expectations and the complaint centers around a condition having a sensation of clutch chatter, especially in the reverse and low speed gear settings or when the engine is suddenly subjected to momentary heavy torque load productive of violent high amplitude sidewise vibration. Careful study of the problem has led to the discovery that a slight revision in the front attachment mount minimizes objectionable chatter without changing restriction to fore and aft movement and without reducing but rather by increasing freedom of movement laterally with respect to low amplitude movement and by establishing limits to the extent of free movement with progressively increased resistance near the limits for a gradual stop.

In general the revisions referred to consist of making certain that no vulcanized bond exists between the rubber and the front and rear flanges of the upper attachment plate and also the addition of end abutment flanges on the plates with portions of the rubber pad projected between the end flanges and which projecting portion is hollow so as to be ineffective in resisting relative movement until a given side movement has occurred in which the void is finally taken up and the rubber between the end flanges is squeezed together and thereafter by its resistance to deformation cushioning further movement. Such hollow space is so formed that it tapers in width and the inwardly converging faces thereof will therefore come into contact with a progressively increased area of abutment as the limit flanges move together whereby a gradual checking of the forces results and excessive side movement is cushioned and resisted in range. Thus fore and aft movement is confined as heretofore but resistance to deflection of the rubber upon relative lateral movement is reduced in the center of the range for ready accommodation of small amplitude vibrations while increased resistance is offered at the extremes of the higher amplitude vibrations. For a better understanding of the invention reference should be made to the accompanying drawing wherein Figure 1 is a front elevation of an engine mounting installation; Figure 2 is a top plan view of one of the mounting units with parts broken away and shown in section and Figures 3 and 4 are vertical sectional views on lines 3—3 and 4—4, respectively, of Figure 2.

The rear of the engine or power output end is stabilized to some degree by drive connection or propeller shaft arrangement and it may be resiliently mounted in the chassis by suitable connections, as for example those in current use on the Chevrolet passenger car. As shown in the drawing, the front of the engine 1 carries a mounting plate 2 for attachment with the transverse frame member 3 by means of a pair of transversely spaced cushion units. Each unit includes a pad 4 of rubber or other similar elastic deformable material vulcanized and surface bonded to a pair of upper and lower plates 5 and 6. A nut 7 is welded or otherwise secured to the plate 5 for receiving a fastening stud 8 by which connection is made with the engine support plate 2 and a similar nut 9 secured to the plate 6 is provided to receive the stud 10 for attachment of the mounting unit to the frame member 3.

Each of the plates 5 and 6 are of rectangular shape in plan and are pressed from sheet metal to substantially cup shape so that they carry at their four edges the marginal skirt portions which provide the side flanges 11—11 and the end flanges 12—12 on the plate 5 and the side flanges 13—13 and end flanges 14—14 on the plate 6, all of which extend on straight lines and are arranged in horizontally spaced and vertically overlapping relation when the cups are nested one within the other so that the flanges 11 and 13 cooperate with one another and with the rubber material therebetween in restricting fore and aft movement of the plates and the end flanges 12 and 14 likewise cooperate with one another and with the rubber material therebetween in the control of lateral movement.

It will be noted that the rubber material is surface bonded to the metal plates throughout their area of contact except those surfaces on the two side flanges 11—11 of the uppermost plate. This lack of adherence is illustrated for convenience by a minute clearance in Figure 4. This lack of adherence allows the rubber in the adjoining region a greater freedom of action with respect to lateral movement but the solidness of the rubber between the cooperating flanges 11 and 13 insures restraint on fore and aft displacement of the metal plates.

While resistance to sidewise deflection is decreased by the absence of a bond between the rubber pad and the side flanges 11 the control of sidewise movement is taken care of by reason of the mating end flanges 12 and 14 in cooperation with the elastic material therebetween. The intervening rubber is bonded to both flanges 12 and 14 but has a hollow space 15 which extends upwardly into the pad and is tapered or of diminishing width so as to form convergently disposed faces adapted to abut one another over a progressively increasing area after a given extent of side movement of the plates.

From the above description it will be apparent that the structure described provides a definite limit to the extent of lateral movement and affords a gradual check on the movement near the opposite limits of the range while affording increased freedom of movement throughout the central portion of the range.

I claim:

1. A cushioned mounting connection including a pair of vertically spaced upper and lower plates of rectangular outline in plan and one of larger extent than the other, with flat marginal flanges at the straight edges of both the sides and the ends of each plate, the side and end flat and straight flanges of the lower plate being in vertically overlapping and laterally spaced relation, each with a mating flat and straight flange of the upper plate, and a load supporting pad of elastic deformable material rectangular in plan outline interposed between and in vertically compressed load supporting relation to said plates and surface bonded to the plates and selectively to said vertical flanges and being characterized by the absence of a surface bond between close fitting surfaces at opposite flat and straight sides of the pad and the side flanges of one of the plates and by a clearance space within the body of each end portion of the pad between the mating end flanges of said plates, said clearance space having vertically converging sides.

2. In a cushion mount of the character described, a pair of vertically spaced and rectangularly shaped attachment plates having vertically overlapping and horizontally spaced faces extending on straight lines on both sides and both ends thereof, elastic deformable material filling the spaces between said plates and between the straight side and end faces, the material between the side faces being solid and bonded to said plates except to the side faces of at least one of the plates and the material between the end faces being hollow with opposed vertical surfaces defining the hollow boundary being divergently related.

3. In a cushion mount of the character described, a pair of rectangular cup shaped attachment plates including sides and ends disposed normal thereto telescoped one in parallel spaced relationship within the other, elastic deformable material filling the larger of the cup shaped attachment plates and bonded to both except along the parallel sides of one cup shaped element, said elastic deformable material having a wedge shaped groove therein between parallel spaced ends of said attachment plates, the said mount providing resiliency longitudinally thereof within limits and relatively less resiliency transversely thereof.

4. In a cushion mount of the character described, a pair of rectangular cup shaped attachment plates including sides and ends disposed normal thereto telescoped one in parallel spaced relationship within the other, elastic deformable material filling the larger of the cup shaped attachment plates and bonded to both except along the inner parallel sides of the outer cup shaped element, said elastic deformable material having a wedge shaped groove therein between parallel spaced ends of said attachment plates, the said mount providing resiliency longitudinally thereof within limits and relatively less resiliency transversely thereof.

JOHN G. ELSE.

REFERENCES CITED

The following references are of record in the file of this patent:

UNITED STATES PATENTS

| Number | Name | Date |
| --- | --- | --- |
| 1,872,259 | Eldridge | Aug. 16, 1932 |
| 1,930,310 | Geyer | Oct. 10, 1933 |
| 2,939,007 | Keller | Apr. 28, 1936 |
| 2,241,385 | Beal | May 3, 1941 |
| 2,248,934 | Auzin | July 15, 1941 |
| 2,252,938 | Lord | Aug. 19, 1941 |
| 2,271,016 | Julien | Jan. 27, 1942 |
| 2,273,869 | Julien | Feb. 24, 1942 |

FOREIGN PATENTS

| Number | Country | Date |
| --- | --- | --- |
| 475,153 | Great Britain | Nov. 8, 1937 |
| 867,341 | France | Oct. 13, 1941 |